United States Patent [19]
Kimura et al.

[11] Patent Number: 5,486,415
[45] Date of Patent: Jan. 23, 1996

[54] POLYPROPYLENE LAMINATE FILM

[75] Inventors: Junichi Kimura, Osaka; Kazuki Wakamatsu, Chiba; Masahito Usui, Chiba; Makoto Satoh, Chiba, all of Japan

[73] Assignee: Sumitomo Chemical Co., Ltd., Osaka, Japan

[21] Appl. No.: 271,981

[22] Filed: Jul. 8, 1994

[30] Foreign Application Priority Data

Jul. 8, 1993 [JP] Japan .................................. 5-168986

[51] Int. Cl.$^6$ ...................................................... B32B 7/12
[52] U.S. Cl. ........................... 428/349; 428/515; 526/159
[58] Field of Search ..................................... 428/349, 515; 526/159

[56] References Cited

U.S. PATENT DOCUMENTS

| | | | |
|---|---|---|---|
| 4,297,411 | 10/1981 | Weiner | 428/347 |
| 4,652,489 | 3/1987 | Crass et al. | 428/349 |
| 4,675,247 | 6/1987 | Kitamura et al. | 428/349 |
| 4,761,462 | 8/1988 | Kitamura et al. | 526/159 |
| 4,769,284 | 9/1988 | Kukugo et al. | 428/349 |
| 4,786,562 | 11/1988 | Kakugo et al. | 425/516 |
| 4,983,561 | 1/1991 | Sasaki et al. | 502/107 |

FOREIGN PATENT DOCUMENTS

| | | |
|---|---|---|
| 0126640 | 11/1984 | European Pat. Off. . |
| 0146968 | 7/1985 | European Pat. Off. . |
| 0263718 | 4/1988 | European Pat. Off. . |
| 4027809 | 3/1992 | Germany . |

Primary Examiner—Edith Buffalow
Attorney, Agent, or Firm—Sughrue, Mion, Zinn, Macpeak & Seas

[57] ABSTRACT

A polypropylene laminate film comprising a crystalline polypropylene layer having laminated on at least one surface thereof a copolymer which is a random copolymer of propylene, ethylene, and an α-olefin having at least 4 carbon atoms, the copolymer being obtained by a vapor-phase polymerization using a catalyst system comprising a solid catalyst component containing magnesium, titanium, and a halogen, an organoaluminum compound, and an electron donative compound in substantially the absence of a liquid medium, and satisfying the following requirements (1) to (7):

(1) the ethylene content of the copolymer is from 3.0 to 7.0% by weight, (2) the content of the α-olefin having at least 4 carbon atoms of the copolymer is from 2.0 to 6.0% by weight, (3) the ratio of the ethylene content to the content of the α-olefin having at least 4 carbon atoms in the copolymer is at least 1.0, (4) the melt flow rate of the copolymer is 10 g/10 minutes or less, (5) the ratio of the weight average molecular weight to the number average molecular weight of the copolymer is 4.5 or less, (6) the melting point of the copolymer is 135°C. or less, and (7) the amount of the n-hexane-soluble components in the copolymer is less than 5.5% by weight.

11 Claims, No Drawings

POLYPROPYLENE LAMINATE FILM

FIELD OF THE INVENTION

The present invention relates to a polypropylene laminate film which has excellent low-temperature heat sealing property and hot tack property and also has a good transparency, a good blocking resistance, and a good solvent resistance.

BACKGROUND OF THE INVENTION

A biaxially oriented crystalline polypropylene film (BOPP) has been widely used as packaging films by utilizing its excellent rigidity, transparency, moisture proof property, etc. However, since BOPP has a difficulty in the heat sealing property, BOPP has hitherto been widely used as a laminate film obtained by laminating a resin having an excellent heat sealing property on one or both surfaces thereof or co-extruding BOPP together with the resin having an excellent heat sealing property.

Hitherto, the property required for the heat-sealing resin has been to what extent the heat-sealing temperature can be decreased. That is, the low-temperature heat sealing property has hitherto been considered to be most important. This is because if the heat-sealing temperature of the heat-sealing resin can be decreased, a bag-making speed using the laminate film can be increased to improve the productivity. As the matter of course, however, the properties such as the transparency, the blocking resistance, etc., of the resin are also important.

However, recently, the diversification of packaging forms, that is, the diversification of materials to be packaged and the diversification of packaging machines due to the diversification of the materials are rapidly advancing, and a hot tack property which has not hitherto been regarded so important for BOPP has been regarded as important as the low-temperature heat sealing property.

Hitherto, various proposals have been made as the heat-sealing resins for BOPP. That is, a propylene-ethylene copolymer obtained by copolymerizing propylene and about 5% by weight of ethylene is well known as a propylene-based heat-sealing resin. Although the copolymer has excellent transparency, blocking resistance, etc., the copolymer is very insufficient in the low-temperature heat sealing property. When the content of ethylene in the copolymer is increased to improve the low-temperature heat sealing property of the propylene-ethylene copolymer, the low-temperature heat sealing property is improved to some extent but there is a problem that the transparency and the blocking resistance greatly deteriorate.

A propylene-butene-1 copolymer obtained by copolymerizing propylene and butene-1 is also well known. For example, propylene-butene-1 copolymers obtained by polymerizing in an inert solvent (so-called slurry polymerization), from which components dissolving in the inert solvent are removed, are disclosed in JP-A-50-128781 and JP-A-55-17542 (the term "JP-A" as used herein means an "unexamined published Japanese patent application") and these copolymers have a good transparency and a good blocking resistance and shows a considerably good result on the low-temperature heat sealing property.

Further, JP-A-56-22307 discloses a propylene-butene-1 copolymer copolymerized using a catalyst system comprising a solid compound comprising titanium trichloride and an organometal compound in the absence of a liquid diluent and having a specific sequence distribution, but the low-temperature heat sealing property of the copolymer is insufficient and also there are problems that the blocking resistance is poor and the transparency deteriorates with the passage of time.

Furthermore, JP-A-60-16645 discloses a propylene-butene-1 copolymer obtained in a vapor phase in substantially the absence of a liquid medium, the copolymer showing good results in the low-temperature heat sealing property, the transparency, and the blocking resistance. However, according to the present inventors' duplication of the JP-A, the hot tack property was insufficient.

A propylene-ethylene-butene-1 terpolymer obtained by copolymerizing propylene, ethylene, and butene-1 is further well known as a heat sealing resin.

For example, JP-A-54-26891 describes a production method of an olefin copolymer by supplying from 0.1 to 4% by weight of ethylene and from 1 to 30% weight of an α-olefin having from 4 to 8 carbon atoms to propylene in a polymerization system. JP-A-53-26882 also describes a propylene terpolymer containing from 0.5 to 1.9% by weight of ethylene and from 0.5 to 4.9% by weight of butene-1 and having a substantially statistic comonomer distribution, and a production method of the propylene terpolymer. Further, JP-A-55-115416 describes that a low-crystalline soft or semi-soft copolymer can be obtained by copolymerizing propylene with from 0.2 to 9 mol% of ethylene and from 0.2 to 9 mol% of a straight chain α-olefin having at least 4 carbon atoms.

However, the copolymers and terpolymers described above do not simultaneously satisfy the low-temperature heat sealing property and the hot tack property, and also do not show an excellent transparency, an excellent blocking resistance, and an excellent solvent resistance.

SUMMARY OF THE INVENTION

Accordingly, an object of the present invention is to provide a polypropylene laminate film having an excellent low-temperature heat sealing property and an excellent hot tack property together with a good transparency, a good blocking resistance and a good solvent resistance.

As a result of various investigations to attain the object described above, it has been found that a polypropylene laminate film laminated with a random copolymer of propylene, ethylene, and an α-olefin having at least 4 carbon atoms, the random copolymer being obtained by a specific polymerization method using a specific catalyst system and having a specific comonomer component, a specific molecular weight, a specific molecular weight distribution, a specific melting point, and specific n-hexane-soluble components, as a heat-sealing resin can satisfy all the required properties, and have accomplished the present invention based on this finding.

According to the present invention, there is provided a polypropylene laminate film comprising a crystalline polypropylene layer having laminated on at least one surface thereof a copolymer which is a random copolymer of propylene, ethylene, and an α-olefin having at least 4 carbon atoms, obtained by a vapor-phase polymerization using a catalyst system comprising a solid catalyst component containing magnesium, titanium, and a halogen as the essential components, an organoaluminum compound, and an electron donative compound, in substantially the absence of a liquid medium, the copolymer satisfying the following requirements (1) to (7);

(1) the ethylene content in the copolymer is from 3.0 to 7.0% by weight, (2) the content of the α-olefin having at least 4 carbon atoms in the copolymer is from 2.0 to 6.0% by weight, (3) the ratio of the ethylene content to the content of the α-olefin having at least 4 carbon atoms in the copolymer is at least 1.0, (4) the melt flow rate of the copolymer is 10 g/10 minutes or less, (5) the ratio of the weight average molecular weight to the number average molecular weight of the copolymer is 4.5 or less, (6) the melting point of the copolymer is 135° C. or less, and (7) the content of n-hexane-insoluble components in the copolymer is less than 5.5% by weight.

DETAILED DESCRIPTION OF THE INVENTION

The present invention is described in detail below.

The first characteristic of the polypropylene laminate film of the present invention is that the laminate film is excellent in both the low-temperature heat sealing property and the hot tack property. The second characteristic of the polypropylene laminate film of the invention is that the laminate film is good in the transparency, the blocking resistance, and the solvent resistance in addition to the excellent low-temperature heat sealing property and hot tack property.

The random copolymer of propylene, ethylene, and the α-olefin having at least 4 carbon atoms used as the heat sealing resin in the present invention is produced by a so-called vapor-phase polymerization method.

In a slurry polymerization which is generally widely used and performs the polymerization in an inert hydrocarbon solvent, a large amount of the polymer formed is dissolved in the inert hydrocarbon solvent, whereby the polymerization becomes very difficult and not only the polymer satisfying the object of the present invention is not obtained but also the yield for the polymer is greatly reduced, which makes the polymerization economically disadvantageous.

The vapor-phase polymerization in the present invention can be practiced using a conventional fluidized bed-type reactor, a fluidized bed-type reactor equipped with a stirrer, etc. Further, it is necessary to conduct the polymerization under the condition of a temperature and a pressure at which the gases are not liquefied and polymer particles formed are not molten to form masses. Particularly preferred polymerization conditions are that the temperature is from 50° C. to 95° C. and the pressure is from 2 to 30 kg/cm$^2$ (gauge pressure, hereinafter referred to as "G"). It is also preferred to add a molecular weight regulator such as hydrogen, etc., for the purpose of controlling a melt flowability of the polymer obtained.

The polymerization can be practiced by a batch-type polymerization, a continuous polymerization, or a method of combining both the polymerizations. The monomers and the molecular weight modifier which are consumed in the polymerization can be supplied to the reactor continuously or intermittently. The copolymer used in the present invention can be washed with an alcohol or a hydrocarbon solvent to remove the catalyst residue or low molecular weight polymers after the vapor-phase polymerization.

The catalyst system for the production of the copolymer used as the heat-sealing resin in the present invention is a conventional stereoregular polymerization catalyst for an α-olefin and is a catalyst system comprising a solid catalyst component (A) containing magnesium, titanium, and a halogen as the essential components, an organoaluminum compound (B), and an electron donative compound (C).

The solid catalyst component (A) contains magnesium, titanium, and a halogen as the essential components and are generally obtained by reducing a titanium compound with an organomagnesium compound to obtain a solid product, treating the solid product with an ester compound, and treating the product obtained with titanium tetrachloride.

The titanium compound used to produce the solid product is represented by the formula Ti(OR)$_b$X$_{4-b}$ wherein R represents a hydrocarbon group having from 1 to 20 carbon atoms, X represents a halogen atom, and b represents a figure of $0 < b < 4$.

Examples of R are an alkyl group such as methyl, ethyl, propyl, iso-propyl, butyl, iso-butyl, amyl, iso-amyl, hexyl, heptyl, octyl, decyl, dodecyl, etc.; an aryl group such as phenyl, cresyl, xylyl, naphthyl, etc.; a cycloalkyl group such as cyclohexyl, cyclopentyl, etc.,; an allyl group such as propenyl, etc.; and an aralkyl group such as benzyl, etc.

The magnesium component which can be used is an optional type organomagnesium compound having a magnesiumcarbon bond. In particular, a Grignard compound represented by the formula RMgX wherein R represents a hydrocarbon group having from 1 to 20 carbon atoms and X represents a halogen atom, and a magnesium compound represented by the formula RR'Mg wherein R and R', which may be the same or different, each represents a hydrocarbon group having from 1 to 20 carbon atoms, are suitably used.

Examples of the Grignard compound are methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagneisum chloride, sec-butylmagnesium bromide, tert-butylmagnesium chloride, tert-butylmagnesium bromide, amylmagnesium chloride, iso-amylmagnesium chloride, phenylmagnesium chloride, phenylmagnesium bromide, etc.

Examples of the magnesium compound represented by the formula RR'Mg are diethylmagnesium, dipropylmagneisum, di-iso-propylmagnesium, dibutylmagnesium, di-sec-butylmagnesium, di-tert-butylmagnesium, butyl-sec-butylmagnesium, diamylmagnesium, diphenylmagnesium, etc.

The organoaluminum compound (B) used in combination with the solid catalyst component (A) has at least one Al-carbon bond in the molecule.

Examples of the organoaluminum compound are a trialkylaluminum such as triethylaluminum, triisobutylaluminum, trihexylaluminum, etc.; a dialkylaluminum halide such as diethylaluminum halide, diisobutylaluminum halide, etc.; a mixture of the trialkylaluminum and the dialkylaluminum halide; and an alkylaluminoxane such as tetraethyldialuminoxane, tetrabutyldialuminoxane, etc.

Of those organoaluminum compounds, the trialkylaluminum, a mixture of the trialkylaluminum and dialkylaluminum halide, and the alkylaluminoxane are preferred, and triethylaluminum, triisobutylaluminum, a mixture of triethylaluminum and triisobutylaluminum, and tetraethyldialuminoxane are more preferred.

The amount of the organoaluminum compound used can be selected in the wide range of from 1 to 1,000 mols, and preferably in the range of from 5 to 600 mols, per mole of titanium atom in the solid catalyst.

The electron donative compound (C) which is preferably used is a silicon compound represented by the formula $R^1R^2Si(OR^3)_2$ wherein $R^1$ and $R^2$ each represents a hydrocarbon group having from 1 to 20 carbon atoms or hydrogen atom, and $R^3$ represents a hydrocarbon group having from 1 to 20 carbon represents a hydrocarbon group having from 1 to 20 carbon atoms, and examples of the silicon compound are as follows. Silicon compound having alicyclic hydrocarbon group:

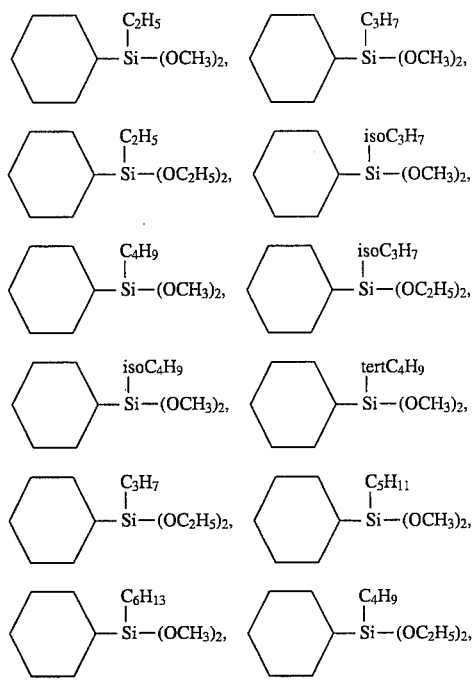

The polymerization is conducted using each catalyst such that the molar ratio of the Al atoms in the component (B) to the Ti atoms in the component (A) becomes from 1 to 1,000 and the molar ratio of the component (C) to the Al atoms in the component (B) becomes from 0.02 to 500, and preferably from 0.05 to 10, at a polymerization temperature of from 20° C. to 150° C., and preferably from 50° C. to 95° C., at a polymerization pressure of from atmospheric pressure to 40 kg/cm$^2$G, preferably from 2 to 30 kg/cm$^2$G and in substantially the absence of a solvent while supplying hydrogen to the system to control the molecular weight of the copolymer of polypropylene, ethylene, and the α-olefin.

The random copolymer of propylene, ethylene, and the α-olefin having at least 4 carbon atoms, used as the heat-sealing resin in the present invention contains specific amounts of ethylene and the α-olefin having at least 4 carbon atoms. The ethylene content of the copolymer is from 3.0 to 7.0% by weight, and preferably from 4.0 to 6.0% by weight. If the ethylene content of the copolymer is less than 3.0% by weight, the effect of improving the low-temperature heat sealing property and the hot tack property of the laminate film becomes insufficient, while if the ethylene content of the copolymer is over 7.0% by weight, the polymer powder property becomes poor in subjecting the copolymer to the vapor-phase polymerization, whereby it becomes difficult to produce the copolymer in a stable manner.

The content of the α-olefin having at least 4 carbon atoms in the copolymer is from 2.0 to 6.0% by weight, and preferably from 3.0 to 5.0% by weight. If the content of the α-olefin having at least 4 carbon atoms in the copolymer is less than 2.0% by weight, the effect of improving the low-temperature heat sealing property and the hot tack property of the laminate film becomes insufficient, while if the content of the α-olefin having at least 4 carbon atoms is over 6.0% by weight, the powdering property becomes poor in subjecting the copolymer to the vapor-phase polymerization, whereby it becomes difficult to produce the copolymer in a stable manner, and further as the case may be, the hot tack property becomes poor.

Examples of the α-olefin are butene-1, pentene-1, hexene-1, 4-methylpentene-1, and the like. Of those, butene-1 is preferred.

The ratio of the ethylene content of the copolymer to the content of the α-olefin having at least 4 carbon atoms of the copolymer is at least 1.0. If the ratio of the ethylene content of the copolymer to the content of the α-olefin having at least 4 carbon atoms in the copolymer is less than 1.0, the hot tack property of the laminate film becomes insufficient.

The melt flow rate (MFR) at 230° C. of the random copolymer of propylene, ethylene, and the α-olefin having at least 4 carbon atoms used as the heat-sealing resin of the present invention is 10 g/$^{10}$ minutes or less, and preferably from 3 to 8 g/$^{10}$ minutes. MFR is a parameter showing an average molecular weight of a polymer, and larger MFR shows that the average molecular weight of the polymer becomes smaller.

If MFR of the copolymer is over the upper limit, the effect of improving the hot tack property becomes insufficient and if MFR of the copolymer is extremely small, the effect of improving the low-temperature heat sealing property becomes insufficient and as the case may be, problems occur to cause poor flowability, etc., at film-formation of the laminate film, which is undesirable in the present invention.

The ratio of the weight average molecular weight to the number average molecular weight. (Mw/Mn) by a gel permeation chromatography (GPC) of the random copolymer of propylene, ethylene, and the α-olefin having at least 4 carbon atoms used as the heat-sealing resin in the present invention is 4.5 or less, and preferably 4.0 or less. Mw/Mn of a polymer is the value showing the molecular weight distribution of the polymer and the small value of Mw/Mn of a polymer means that the molecular weight distribution of the polymer is narrow.

The influence of the molecular weight distribution of the copolymer giving the heat sealing performances such as the low-temperature heat sealing property, the hot tack property, etc., has not yet been clarified, but it is expected that low molecular weight components contained in large amount in the copolymer having a wide molecular weight distribution may give an influence onto the heat sealing performances for some form.

The random copolymer of propylene, ethylene, and the α-olefin having at least 4 carbon atoms used as the heat-sealing resin in the present invention has a melting point of 135° C. or less. If the melting point of the copolymer is higher than 135° C., the effect of improving, in particular, the hot tack property of the laminate film becomes insufficient and if the melting point of the copolymer is too low, problems occur on the workability and the blocking property of the laminate film. Thus, the melting point of the copolymer is preferably from 110° C. to 135° C., and more preferably from 120° C. to 135° C.

The amount of the n-hexane-soluble components at 50° C. of the random copolymer of propylene, ethylene, and the α-olefin having at least 4 carbon atoms used as the heat-sealing resin in the present invention is less than 5.5% by weight. If the amount of the n-hexane-soluble components of the copolymer is over 5.5% by weight, the solvent resistance of the laminate film becomes insufficient.

The copolymer used as the heat-sealing resin in the present invention is obtained by a vapor-phase polymerization and the copolymer obtained may not be subjected to post-treatment such as a washing step, etc., or may be subjected to a proper washing step.

The copolymer used as the heat-sealing resin in the present invention can be blended with up to about 20% by weight of a rubbery ethylene-α-olefin copolymer, polybutene-1 (including a copolymer type), a propylene-butene-1 copolymer, etc., and also can be blended with a small amount of other polymeric material.

The copolymer can further contain additives such as an antistatic agent, an anti-blocking agent, a lubricant, a stabilizer, etc.

The polypropylene laminate film of the present invention can be obtained by laminating the heat-sealing resin on one surface or both the surfaces of a crystalline polypropylene film as a substrate by a conventional method. That is, the laminate film of the present invention is obtained by a method of previously forming the substrate layer in a sheet form and the heat-sealing layer in a sheet form and passing the sheets between press rollers using an adhesive, a method of laminating the heat-sealing resin on the substrate layer by coating a solution or dispersion of the heat-sealing resin in a solvent such as toluene, etc., on the substrate layer, a method of laminating the heat-sealing resin on the substrate layer by melt-extruding the heat-sealing resin and coating the same on the substrate layer, a method of extruding separately the heat-sealing resin and the substrate polymer by separate extruding machines and joining both the extruded sheets in a common die or the outlet of a common die in molten states thereof, etc.

The laminate film of the present invention is preferably uniaxially or biaxially oriented after laminating the heat-sealing layer. Such an oriented polypropylene laminate film can be produced by the following conventional methods: (1) a method of preparing a raw laminate sheet by a so-called co-extrusion of compositing both the crystalline polypropylene resin layer and heat-sealing resin layer in an extruding die or near the outlet of the extruding die for forming sheet in the molten states thereof and then biaxially orienting the laminate sheet; (2) a method of extrusion laminating the heat-sealing resin on a polypropylene sheet as the substrate and then biaxially orienting the laminate sheet; (3) a method of previously uniaxially orienting a polypropylene sheet as the substrate in a machine direction (MD) in a heated state by rolls including metal rolls, extrusion laminating thereon the heat-sealing resin, and then orienting the laminate sheet in a transverse direction (TD); etc.

The polypropylene laminate film produced as above has an excellent low-temperature heat sealing property together with an excellent hot tack property, is excellent in the transparency, the blocking resistance, and the solvent resistance, and also has a very large practical value that the laminate film can be produced at a low cost.

The present invention will be described in more detail by reference to the following Examples, but the invention is not construed as being limited thereto.

Each measurement item in the examples and the comparative examples was measured according to the following method.

(1) Ethylene content and α-olefin content (wt%)

Ethylene content: The ethylene content was determined by an IR spectral method according to the method described in *Koobunshi Bunseki* (*High Molecular Material Analysis*) *Handbook*, page 256 "(i) Random Copolymer", (published by Asakura Shoten K.K., 1985).

Butene-1 content: The butene-1 content was determined by the IR spectral method from the following equation.

$$\text{Butene-1 content (wt\%)} = 1.208 K'$$

$K'$ is the absorbance at 767 cm$^{-1}$ (2) Weight average molecular weight/number average molecular weight (Mw/Mn)

The ratio was measured by a gel permeation chromatography (GPC) under the following conditions. A calibration curve was prepared using standard polystyrene.

Apparatus: Type 150 CV, manufactured by Millipore Waters Co.

Column: Shodex M/S 80

Measurement temperature: 145° C.

Solvent: Orthodichlorobenzene

Sample concentration: 5 mg/8 ml.

When Standard Reference Material 706 (polystyrene of Mw/Mn=2.1) of NBS (National Bureau of Standards) was measured under the above conditions, the molecular weight distribution (Mw/Mn) of 2.1 was obtained.

(3) Melt flow rate (MFR) (g/10 minutes)

MFR was measured by the method of Condition-14 according to JIS K 7210.

(4) Melting point (Tm) (° C.)

After previously melting 10 mg of a sample piece at 220° C. for 5 minutes, the temperature was decreased to 40° C. at a temperature-decreasing rate of 5° C./minute using a differential scanning calorimeter (DSC, trade name, manufactured by Perkin-Elmer Co.). The peak temperature of the maximum peak in a crystallization exothermic curve obtained was defined as a crystallization temperature (Tc).

The temperature was then raised at 5° C./minute and the peak temperature of the maximum peak in the fusion endothermic curve obtained was defined as a melting point (Tm).

In addition, the melting point of indium (In) measured using the measurement apparatus at a temperature-raising rate of 5° C./minute was 156.6° C.

(5) Solvent resistance (n-hexane extracted amount)

The solvent resistance was measured according to FDA 177 1520.

(6) Low-temperature heat sealing property (heat sealing temperature) (° C.)

Films were superposed each other and they were heat-sealed by press-adhering them using a heat sealer (manufactured by Toyo Seiki K.K.) heated to a definite temperature under a load of 2 kg/cm$^2$G (gauge pressure) for 2 seconds. After allowing to stand the heat-sealed sample overnight, the heat-sealed films were peeled each other at 23° C., at a peeling speed of 200 mm/minute, and at a peeling angle of 180°. The sealing temperature when the peel-resistant force became 300 g/25 mm at peeling the films under the conditions described above was measured and defined as a heat sealing temperature.

(7) Hot tack property (g/25 mm)

Films were superposed each other and they were heat-sealed by press-adhering them using a heat sealer (Tester Sangyo K.K.) heated to a definite temperature under a load of 2 kg/cm$^2$G (gauge pressure) for 2 seconds. Immediately after removing the load, a peeling force was applied to the sealed portion by a tabular spring, and the peeling force that the peeling length showed ⅛ inches (3.2 mm) was measured.

REFERENCE EXAMPLE (a) Synthesis of Organomagnesium Compound:

After replacing the inside atmosphere of a 1 liter flask equipped with a stirrer, a reflux condenser, a dropping funnel, and a thermometer with argon gas, 32.0 g of chip-form magnesium for Grignard was placed in the flask. 120 g of butyl chloride and 500 ml of dibutyl ether were charged in the dropping funnel and about 30 ml of the resulting mixture was added dropwise to magnesium in the flask to initiate the reaction. After initiation of the reaction, the dropwise addition was continued at 50° C. over 4 hours. After completion of the dropwise addition, the reaction was further continued at 60° C. for 1 hour. The reaction mixture was cooled to room temperature and solid components were filtered off.

Butylmagnesium chloride in dibutyl ether was hydrolyzed with 1 N sulfuric acid aqueous solution and when the concentration was determined using phenolphthalein as an indicator by back titration with a 1N sodium hydroxide aqueous solution, the concentration was 2.1 mol/liter.

(b) Synthesis of Solid Product:

After replacing the inside atmosphere of a 500 ml flask equipped with a stirrer and a dropping funnel with argon gas, 240 ml of hexane, 5.4 g (15.8 mmols) of tetrabutoxytitanium, and 61.4 g (295 mmols) of tetraethoxysilane were placed in the flask to form a uniform solution. 150 ml of the organomagnesium compound synthesized in the synthesis (a) above was gradually added dropwise into the flask from the dropping funnel over 4 hours while keeping the inside temperature of the flask at 5° C. After completion of the dropwise addition, the resulting mixture was further stirred at room temperature for 1 hour. Solid components were separated from a liquid component at room temperature, washed 3 times with 240 ml of hexane, and dried under a reduced pressure to obtain 45.0 g of a light-brown solid product.

The solid product obtained contained 1.7% by weight of a titanium atom, 33.8% by weight of an ethoxy group, and 2.9% by weight of a butoxy group.

Clear diffraction peaks were not observed in a wide angle X-ray diffraction diagram of the solid product with the Cu-Kα line, which showed that the solid product was an amorphous structure.

(c) Synthesis of Ester Treated Solid:

After replacing the inside atmosphere of a 100 ml flask with argon gas, 6.5 g of the solid product synthesized in the synthesis (b) above, 16.2 ml of toluene, and 4.3 ml (16 mmols) of diisobutyl phthalate were placed in the flask and the reaction was conducted at 95° C. for 1 hour.

(d) Synthesis of Solid Catalyst (Activation Treatment):

After completion of washing of the reaction product in the synthesis (c) above, 16.2 ml of toluene, 0.36 ml (1.3 mmols) of diisobutyl phthalate, 2.2 ml (13 mmols) of butyl ether, and 38.0 ml (346 mmols) of titanium tetrachloride were added to the product in the flask and the reaction was conducted at 95° C. for 3 hours. After completion of the reaction, solid components formed were separated from a liquid phase at 95° C. and washed twice with 33 ml of toluene at the same temperature. The treatment with a mixture of diisobutyl phthalate, butyl ether, and titanium tetrachloride described above was further repeated once again and the solid components separated were washed 3 times with 33 ml of hexane to obtain 5.0 g of a yellow ocher-color solid catalyst.

The solid catalyst contained 2.1% by weight of a titanium atom, 19.9% by weight of a magnesium atom, and 12.7% by weight of a phthalic acid ester.

EXAMPLE 1

(a) Catalyst Component

After adding 150 liters of hexane sufficiently purified into a 250 liter reactor equipped with a stirrer and sufficiently replacing the inside atmosphere of the reactor with nitrogen gas, 3.2 mols of triethylaluminum (TEA), 0.32 mol of cyclohexylethyldimethoxysilane (CHEDMS), and the solid catalyst obtained in the Reference Example above in an amount of 51.8 g calculated as Ti atom were added thereto. While maintaining temperature of the mixture at 25° C., 2.8 kg of propylene was continuously added thereto over 2 hours.

(b) Polymerization

In a 1,000 liter polymerization bath was supplied the catalyst component prepared in the above step (a), while simultaneously supplying 52 mmols/hour of TEA and 5 mmols of CHEDMS (Al CHEDMS=10/1 by molar ratio), propylene and butene-1 were continuously supplied thereto at a $H_2$ concentration in the polymerization bath of 0.22%, and the vapor-phase polymerization was conducted at a polymerization temperature of 80° C., a polymerization pressure of 18 kg/cm$^2$G, and an average residence time of 6 hours.

The ethylene content and the butene-1 content of the copolymer obtained were 4.7% by weight and 3.9% by weight, respectively (see Table 1 below).

To 100 parts by weight of the copolymer were added 0.15 part by weight of calcium stearate, 0.1 part by weight of Sumilizer BHT (trade name, made by Sumitomo Chemical Co.), and 0.05 part by weight of Irganox 1010 (trade name, made by Ciba Geigy), and after mixing them by a Henschel mixer, the mixture was melt extruded to form pellets.

(c) Laminate Layer Formation and Orientation Treatment

The copolymer pellets obtained were formed into a sheet having a thickness of 100 μm by a press method and the sheet was melt press-adhered to a homopolypropylene sheet (MFR=2.5) having a thickness of 500 μm previously formed by a press method to obtain a laminate sheet. A sample of 90 mm×90 mm was cut from the laminate sheet thus obtained and a biaxially oriented film was obtained by the following conditions.

Stretching machine: Desk biaxially stretching machine, manufactured by Toyo Seiki K.K.

Temperature: 150° C.

Pre-heating time: 3 minutes

Orientation magnification: 5×5 times

Orientation speed: 5 m/minute

The properties of the oriented laminate film having a thickness of 24 μm obtained described above are shown in Table 2 below.

The oriented laminate film was excellent in the low-temperature heat sealing property and the hot tack property and showed a good transparency.

EXAMPLE 2

By following the same vapor-phase polymerization as in Example 1 except that the amount of CHEDMS supplied was changed to 7 mmols/hour (Al CHEDMS=10/1.4 by molar ratio) and the amounts of ethylene and butene-1 supplied were changed, a copolymer was obtained. The ethylene content and the butene-1 content of the copolymer obtained were 4.4% by weight and 4.1% by weight, respectively. The formation of pellets, the laminate formation, and the orientation treatment were conducted under the same conditions as in Example 1 to obtain an oriented laminate film and the properties of the oriented laminate film are shown in Table 2 below.

The oriented laminate film was also excellent in the low-temperature heat sealing property and the hot tack property and showed a good transparency as same as the product in Example 1.

EXAMPLE 3

A vapor-phase polymerization was conducted by continuously supplying propylene, ethylene, and butene-1 in the same manner as in Example 1 except that two polymerization baths having an inside volume of from 20 to 45 $m^3$ were used, the polymerization temperature was changed to 70° C., the polymerization pressure was changed to from 15 to 19 $kg/cm^2G$ (Al CHEDMS=10/3 by molar ratio), and the $H_2$ concentration was changed to 0.35%. The ethylene content and the butene-1 content of the copolymer obtained were 4.4% by weight and 4.1% by weight, respectively.

The pelletization, the laminate formation, and the orientation treatment were conducted under the same conditions as in Example 1 to obtain an oriented laminate film and the properties thereof are shown in Table 2 below.

The oriented laminate film was also excellent in the low-temperature heat sealing property and the hot tack property.

EXAMPLE 4

A vapor-phase polymerization was conducted under the same conditions as in Example 3 except that the $H_2$ concentration was changed to 0.45% to obtain a copolymer.

The pelletization, the laminate formation, and the orientation treatment were conducted under the same conditions as in Example 1 to obtain an oriented laminate film and the properties thereof are shown in Table 2 below.

The oriented laminate film was also excellent in the low-temperature heat sealing property and the hot tack property.

COMPARATIVE EXAMPLE 1

A vapor-phase polymerization was conducted under the same conditions as in Example 3 except that the $H_2$ concentration was changed to 0.6% to obtain a copolymer.

The pelletization, the laminate formation, and the orientation treatment were conducted under the same conditions as in Example 1 to obtain an oriented laminate film and the properties thereof are shown in Table 2 below.

The oriented laminate film showed an excellent low-temperature heat sealing property but the hot tack property thereof was insufficient.

COMPARATIVE EXAMPLE 2

A vapor-phase polymerization was conducted by continuously supplying propylene, ethylene, and butene-1 in the same manner as in Example 1 except that 3 polymerization baths having an inside volume of from 20 to 45 $m^3$ were used, the polymerization temperature was changed to 80° C., the polymerization pressure was changed to from 7 to 15 $kg/cm^2G$ (Al CHEDMS=10/1.7 by molar ratio), and the $H_2$ concentration was changed to 0.4% to obtain a copolymer. The ethylene content and the butene-1 content of the copolymer obtained were 2.5% by weight and 5.1% by weight, respectively.

The pelletization, the laminate formation, and the orientation treatment were conducted under the same conditions as in Example 1 to obtain an oriented laminate film and the properties thereof are shown in Table 2 below.

The oriented laminate film was insufficient in both the low-temperature heat sealing property and the hot tack property.

COMPARATIVE EXAMPLE 3

A vapor-phase polymerization was conducted under the same conditions as in Comparative Example 2 except that the amounts of propylene, ethylene, and butene-1 supplied were changed to obtain a copolymer. The ethylene content and the butene-1 content of the copolymer obtained were 1.2% by weight and 10.2% by weight, respectively.

The pelletization, the laminate formation, and the orientation treatment were conducted under the same conditions as in Example 1 to obtain an oriented laminate film and the properties thereof are shown in Table 2 below.

The oriented laminate film was insufficient in both the low-temperature heat sealing property and the hot tack property.

COMPARATIVE EXAMPLE 4

A copolymer was obtained by a slurry polymerization method using n-heptane as the solvent. The ethylene content and the butene-1 content of the copolymer were 2.1% by weight and 5.6% by weight, respectively.

The pelletization, the laminate formation, and the orientation treatment were conducted under the same conditions as in Example 1 to obtain an oriented laminate film and the properties thereof are shown in Table 2 below.

COMPARATIVE EXAMPLE 5

A vapor-phase polymerization was conducted by continuously supplying propylene, ethylene, and butene-1 under the same conditions as in Comparative Example 1 except that the polymerization temperature was changed to 75° C. and the $H_2$ concentration was changed to 0.35% to obtain a copolymer. The copolymer having the ethylene content of 2.0% by weight and the butene-1 content of 13.1% by weight was obtained. However, the operation load of the polymerization baths was increased and the operation was in an unstable operation state. Further, the copolymer obtained had a n-hexane extracted amount of 12.9% by weight, which showed a very poor solvent resistance.

TABLE 1

|  | Ethylene Content (wt %) | Butene-1 Content (wt %) | Mw/Mn | MFR (g/10 min) | Tm (°C.) | n-Hexane Extracted Amount (wt %) |
| --- | --- | --- | --- | --- | --- | --- |
| Example 1 | 4.7 | 3.9 | 3.2 | 5.4 | 127 | 3.7 |

TABLE 1-continued

|  | Ethylene Content (wt %) | Butene-1 Content (wt %) | Mw/Mn | MFR (g/10 min) | Tm (°C.) | n-Hexane Extracted Amount (wt %) |
| --- | --- | --- | --- | --- | --- | --- |
| Example 2 | 4.4 | 4.1 | 2.8 | 5.8 | 129 | 3.3 |
| Example 3 | 4.4 | 4.1 | 2.9 | 3.1 | 129 | 2.6 |
| Example 4 | 4.4 | 4.0 | 2.7 | 7.2 | 129 | 3.3 |
| Comparative Example 1 | 4.4 | 4.1 | 2.5 | 13.3 | 129 | 3.5 |
| Comparative Example 2 | 2.5 | 5.1 | 3.1 | 8.6 | 139 | 2.5 |
| Comparative Example 3 | 1.2 | 10.2 | 3.2 | 8.3 | 138 | 2.3 |
| Comparative Example 4 | 2.1 | 5.6 | 5.2 | 8.6 | 139 | 2.0 |
| Comparative Example 5 | 2.0 | 13.1 | 3.0 | 4.6 | 127 | 12.9 |

TABLE 2

|  | Heat-sealing Temperature (°C.) | Hot Tack Property (g/25 mm) | | | | | | | |
| --- | --- | --- | --- | --- | --- | --- | --- | --- | --- |
|  |  | 90° C. | 100° C. | 110° C. | 120° C. | 130° C. | 140° C. | 150° C. | 160° C. |
| Example 1 | 117 | 53> | 53> | 236 | 295< | 168 | 133 | 112 | 81 |
| Example 2 | 119 | 53> | 53> | 203 | 295< | 165 | 126 | 93 | 72 |
| Example 3 | 118 | 53> | 53> | 238 | 295< | 262 | 165 | 124 | 98 |
| Example 4 | 118 | 53> | 53> | 228 | 295< | 156 | 115 | 93 | 72 |
| Comparative Example 1 | 118 | 53> | 53> | 210 | 295< | 137 | 98 | 78 | 68 |
| Comparative Example 2 | 128 | 53> | 53> | 53> | 295< | 295< | 114 | 81 | 62 |
| Comparative Example 3 | 124 | 53> | 53> | 53> | 295< | 295< | 104 | 87 | 71 |
| Comparative Example 4 | 129 | 53> | 53> | 53> | 53> | 295< | 117 | 93 | 63 |

According to the present invention, a polypropylene laminate film can be produced, which is excellent in both the low-temperature heat sealing property and the hot tack property and has a good transparency, a good blocking resistance, and a good solvent resistance.

While the invention has been described in detail and with reference to specific embodiments thereof, it will be apparent to one skilled in the art that various changes and modifications can be made therein without departing from the spirit and scope thereof.

What is claimed is:

1. A polypropylene laminate film comprising a crystalline polypropylene layer having laminated on at least one surface thereof a copolymer which is a random copolymer of propylene, ethylene, and an α-olefin having at least 4 carbon atoms, the copolymer being obtained by a vapor-phase polymerization using a catalyst system comprising a solid catalyst component containing magnesium, titanium, and a halogen, an organoaluminum compound, and an electron donative compound in substantially the absence of a liquid medium, and satisfying the following requirements (1) to (7):

(1) the ethylene content of the copolymer is from 3.0 to 7.0% by weight, (2) the content of the α-olefin having at least 4 carbon atoms of the copolymer is from 2.0 to 6.0% by weight, (3) the ratio of the ethylene content to the content of the α-olefin having at least 4 carbon atoms in the copolymer is at least 1.0, (4) the melt flow rate of the copolymer is 10 g/10 minutes or less, (5) the ratio of the weight average molecular weight to the number average molecular weight of the copolymer is 4.5 or less, (6) the melting point of the copolymer is 135° C. or less, and (7) the amount of the n-hexane-soluble components in the copolymer is less than 5.5% by weight.

2. A polypropylene laminate film as claimed in claim 1, wherein the solid catalyst component is obtained by reducing a titanium compound with an organomagnesium compound, treating the reduced solid product with an ester compound, and treating the treated product with titanium tetrachloride.

3. A polypropylene laminate film as claimed in claim 1, wherein the organoaluminum compound has at least one aluminum-carbon bond in the molecule.

4. A polypropylene laminate film as claimed in claim 1, wherein the electron donative compound is silicon compound.

5. A polypropylene laminate film as claimed in claim 1, wherein the vapor-phase polymerization was conducted at a temperature of from 20° to 150° C. under a pressure of from atmospheric pressure to 40 kg/cm$^2$G.

6. A polypropylene laminate film as claimed in claim 1, wherein the ethylene content of the copolymer is from 4.0 to 6.0% by weight.

7. A polypropylene laminate film as claimed in claim 1, wherein the α-olefin content of the copolymer is from 3.0 to 5.0% by weight.

8. A polypropylene laminate film as claimed in claim 1, wherein the melt flow rate of the copolymer is from 3 to 8 g/10 minutes.

9. A polypropylene laminate film as claimed in claim 1, wherein the ratio of the weight average molecular weight to the number average molecular weight of the copolymer is 4.0 or less.

10. A polypropylene laminate film as claimed in claim 1, wherein the melting point of the copolymer is from 110° to 35° C.

11. A polypropylene laminate film as claimed in claim 1, wherein the α-olefin having at least 4 carbon atoms is butene-1.

* * * * *